US010469749B1

(12) United States Patent
Linzer (10) Patent No.: US 10,469,749 B1
(45) Date of Patent: Nov. 5, 2019

(54) TEMPORAL FILTER WITH CRITERIA SETTING MAXIMUM AMOUNT OF TEMPORAL BLEND (71) Applicant: Ambarella, Inc., Santa Clara, CA (US)

(72) Inventor: Elliot N. Linzer, Bergenfield, NY (US)

(73) Assignee: Ambarella, Inc., Santa Clara, CA (US)

( * ) Notice: Subject to any disclaimer, the term of this patent is extended or adjusted under 35 U.S.C. 154(b) by 0 days.

(21) Appl. No.: 15/967,722

(22) Filed: May 1, 2018

(51) Int. Cl.
*H04N 5/232* (2006.01)
*G06T 5/00* (2006.01)
*H04N 5/243* (2006.01)
*G06T 5/50* (2006.01)

(52) U.S. Cl.
CPC ......... *H04N 5/23254* (2013.01); *G06T 5/00* (2013.01); *G06T 5/50* (2013.01); *H04N 5/23277* (2013.01); *H04N 5/243* (2013.01); *G06T 5/002* (2013.01); *G06T 2207/20182* (2013.01)

(58) Field of Classification Search
CPC ......... H04N 5/23254; H04N 5/23277; H04N 5/243; H04N 5/23229; H04N 5/23232; H04N 5/23267; G06T 5/00; G06T 5/50; G06T 2207/20182; G06T 5/002; G06T 5/001; G06T 5/003; G06T 7/20; G06T 7/0016; G06T 7/0014; G06T 3/0087
See application file for complete search history.

(56) References Cited

U.S. PATENT DOCUMENTS

| 5,467,380 A * | 11/1995 | De Jonge | H04N 5/21 348/E5.077 |
|---|---|---|---|
| 9,324,139 B1 * | 4/2016 | Linzer | G06T 5/009 |
| 2007/0116125 A1 * | 5/2007 | Wada | H04N 19/139 375/240.16 |
| 2011/0085084 A1 * | 4/2011 | Jain | G06T 5/002 348/598 |
| 2012/0106639 A1 * | 5/2012 | Yang | G06T 5/002 375/240.16 |
| 2012/0163726 A1 * | 6/2012 | Lee | G06T 5/002 382/233 |
| 2014/0341480 A1 * | 11/2014 | Hamada | G06T 5/002 382/264 |
| 2019/0020894 A1 * | 1/2019 | Peng | H04N 19/523 19/523 |

* cited by examiner

*Primary Examiner* — Albert H Cutler
(74) *Attorney, Agent, or Firm* — Christopher P. Maiorana, PC (57) ABSTRACT

An apparatus includes a processor circuit and a correction circuit. The processor circuit may be configured to receive a sequence of pictures. The correction circuit may be configured to (i) generate a motion score based upon target samples from a target picture and reference samples from one or more reference pictures of the sequence of pictures, (ii) generate a first weight value based upon the motion score and a first weight limit value, and (iii) generate a plurality of blended picture samples by combining the target samples and the reference samples based upon the first weight value.

20 Claims, 7 Drawing Sheets

TEMPORAL FILTER WITH CRITERIA SETTING MAXIMUM AMOUNT OF TEMPORAL BLEND

FIELD OF THE INVENTION

The invention relates to digital image processing generally and, more particularly, to a method and/or apparatus for implementing a temporal filter with a separate criteria setting a maximum amount of temporal blending.

BACKGROUND

Motion detection is used in many applications, such as security cameras, game cameras, or motion compensated temporal filtering (MCTF). For the latter, a filter adaptively combines a previous (reference) frame and a current (target) frame. The filter decides locally how to combine the two frames to reduce noise while limiting filtering artifacts. Conventional MCTF reduces noise by taking a weighted average of the current frame and one or more previous frames. In a recursive filter, the "one or more previous frames" are MCTF outputs. MCTF reduces noise because when there is no motion, or the motion is correctly modeled and compensated, the MCTF output is a weighted average of noisy samples of the same image sample, which will statistically be less noisy than a single sample. Typically, the filter will use (weight) the reference more strongly the more the filter determines that, locally, there is no motion. A problem with conventional temporal filter blending occurs where the current target frame is too strongly blended with the reference frames, resulting in a filtered picture that does not fully reflect the current target frame.

It would be desirable to implement a temporal filter with a separate criteria setting a maximum amount of temporal blending.

SUMMARY

The invention concerns an apparatus including a processor circuit and a correction circuit. The processor circuit may be configured to receive a sequence of pictures. The correction circuit may be configured to (i) generate a motion score based upon target samples from a target picture and reference samples from one or more reference pictures of the sequence of pictures, (ii) generate a first weight value based upon the motion score and a first weight limit value, and (iii) generate a plurality of blended picture samples by combining the target samples and the reference samples based upon the first weight value.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing a temporal filter with a separate criteria setting a maximum amount of temporal blending that may (i) allow setting a minimum value on a fraction of a temporal reference used in filtering, (ii) allow setting a maximum value on a fraction of a temporal reference used in filtering, (iii) utilize a separate criteria to set a maximum value for a weight for temporal blending, (iv) utilize a separate criteria to set a maximum value for a weight for spatial temporal blending, (v) improve temporal filtering results, (vi) reduce noise, and/or (vii) be implemented as one or more integrated circuits.

In various embodiments, a second separate criterion is used to limit an amount of a reference picture that is blended in an output of a motion compensated temporal filter (MCTF). In various embodiments, a primary motion detection is used to decide how much reference picture data to blend in an output and a separate secondary criteria is used to limit the amount of reference picture data that is blended in the output (e.g., limiting the maximum strength of the temporal filter).

In an example, a temporal filter may be used of a type that may be described by the following Equation 1:

$$F[N,y,x]=W[N,y,x]*T[N,y,x]+(1-W[N,y,x])*F[N-1,y,x], \quad \text{EQ. 1}$$

where W[N,y,x]<=1, F represents the filtered frame, T represents the target frame, N represents the frame number, y represents the row number, and x represents the column number. When a type of filter as described by Equation 1 is used, setting a minimum value on W generally sets a maximum on the fraction of the temporal reference used. In various embodiments, the type of filter described by Equation 1 may be used as the paradigm for limiting the fraction of the temporal reference in the filtered output. However, other limiting methods may be implemented to meet design criteria of a particular implementation.

In another example, a temporal filter may be used of a type that may be described by the following Equation 2:

$$F[N,y,x]=W[N,y,x]*F[N-1,y,x]+(1-W[N,y,x])*T[N,y,x], \quad \text{EQ. 2}$$

where W[N,y,x]<=1, F represents the filtered frame, T represents the target frame, N represents the frame number, y represents the row number, and x represents the column number. When a type of filter as described by Equation 2 is used, setting a maximum value on W generally sets a maximum on the fraction of the temporal reference used. Various embodiments of the second criteria may be implemented as discussed below.

Figure 1:
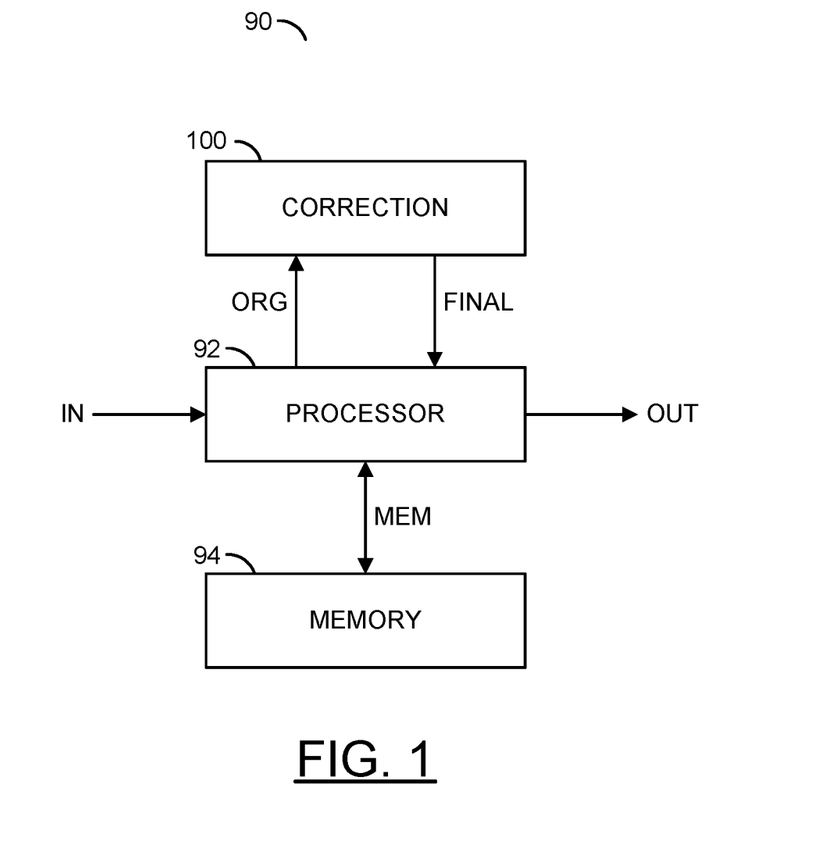
FIG. 1 is a diagram illustrating an apparatus in accordance with an embodiment of the invention.

Referring to FIG. 1, a block diagram illustrating an example implementation of an apparatus 90 is shown in accordance with an embodiment of the invention. The apparatus (or circuit or device or integrated circuit) 90 may implement a video processing system. The apparatus 90 generally comprises a block (or circuit) 92, a block (or circuit) 94 and a block (or circuit) 100. The circuits 92 to 100 may be implemented utilizing hardware, software, firmware, or any combination thereof in an apparatus. In some embodiments, the apparatus 90 may be a digital video camera, a digital still camera, a hybrid digital video/still camera, a display monitor, a television, a computer vision system, and/or a post processing system.

The circuit 92 may be directly coupled with the circuit 94 to exchange data and control information in a bidirectional signal (e.g., MEM). An input signal (e.g., IN) may be received by the circuit 92. The signal IN may convey a sequence of pictures (e.g., multiple exposures, a video signal, etc.). An output signal (e.g., OUT) may be presented by the circuit 92. The signal OUT may carry a processed version of the signal IN. In an example embodiment, the signal OUT may be configured to convey a temporal filtered version of the signal IN. A signal (e.g., ORG) may be transferred from the circuit 92 to the circuit 100. The signal ORG may carry original (unprocessed) pictures. A signal (e.g., FINAL) may be generated by the circuit 100 and presented to the circuit 92. The signal FINAL may convey the pictures after undergoing a correction process. In various embodiments, the correction process generally includes a temporal filter operation with maximum temporal blend amount criteria.

In an example, the signal IN or OUT may comprise one or more analog video signals and/or one or more digital video signals. Each signal IN and OUT generally comprises a sequence of progressive-format frames and/or interlace-format fields. The frames and/or fields may also be referred to as images and/or pictures. The analog/digital video signals may include synchronization signals suitable for synchronizing the video information. The analog video signals may be presented in analog form as, but not limited to, an RGB (Red, Green, Blue) signal, an EIA-770 (e.g., YCrCb) signal, an S-video signal and/or a composite video baseband signal (e.g., CVBS). In digital form, the video signals may be presented as, but are not limited to, a high definition multimedia interface (e.g., HDMI) signal, a digital video interface (e.g., DVI) signal, and/or a BT.656 signal. The video signals may be formatted as standard definition signals and/or high definition signals. Other video standards may be implemented to meet the design criteria of a particular application.

The circuit 92 may be implemented as a processor circuit. The circuit 92 may be operational to perform digital video enhancement operations on the data received in the signal IN. The enhancement operations may include, but are not limited to, sharpening, decimation filtering, interpolation, formatting, color space conversions, color corrections, tone corrections, gain corrections, offset corrections, black level calibrations, white balancing, image sharpening, image smoothing, and the like. The circuit 92 generally comprises one or more digital signal processors (or cores). The circuit 92 may be fabricated as an integrated circuit in (on) a single chip (or die). In some embodiments, the circuits 92, 94, and/or 100 may be fabricated in (on) the same chip. In other embodiments, the circuits 92, 94, and 100 may be fabricated in (on) separate chips.

In an example, the circuit 94 may be implemented as dynamic random access memory (e.g., DRAM). The memory circuit 94 may be operational to store or buffer large amounts of information consumed and generated by the processing operations of the apparatus 90. As such, the memory circuit 94 may be referred to as a main (or external) memory. The memory circuit 94 may be implemented as a double data rate (e.g., DDR, DDR2, DDR3, DDR4, DDR5, etc.) memory. Other memory technologies may be implemented to meet the criteria of a particular application. The memory circuit 94 may be fabricated as an integrated circuit in (on) a single chip (or die). In some embodiments, the circuits 92, 94, and 100 may be fabricated together in (on) a single chip.

The circuit 100 may implement a correction circuit. In various embodiments, the correction circuit 100 is generally operational to apply a correction technique comprising a temporal filter operation including criteria setting a maximum amount of temporal blending. The correction circuit 100 may be configured to apply the temporal filter operation to the pictures conveyed in the signal ORG. In an example, the pictures may comprise a current target picture (e.g., TARGET) and one or more reference pictures (e.g., REFERENCE). Various reference samples (e.g., luminance values) of the reference pictures and co-located target samples (e.g., luminance values) of the target picture may have different levels (e.g., due to local lighting conditions, etc.). In various embodiments, the temporal filter operation generally utilizes a primary motion detection to decide how much blending to do and applies some secondary criteria to limit the amount of the reference data in the corrected (filtered) output pictures.

In an example, a correction technique in accordance with embodiments of the invention may provide separate criteria for setting a limit (or limits) on the maximum strength of a temporal filter, a spatial filter, or a combined spatial-temporal filter. In an example, the limit(s) may be based on a predefined value or a dynamically determined value. The corrected pictures may be presented back to the processor circuit 92 via the signal FINAL. The correction circuit 100 may perform additional processing on the corrected pictures. The processing may include, but is not limited to motion detection, temporal filtering, and/or spatial-temporal filtering. The correction circuit 100 may be fabricated as an integrated circuit in (on) a single chip (or die). In some embodiments, the circuits 92, 94 and 100 may be fabricated together in (on) a single chip.

Figure 2:
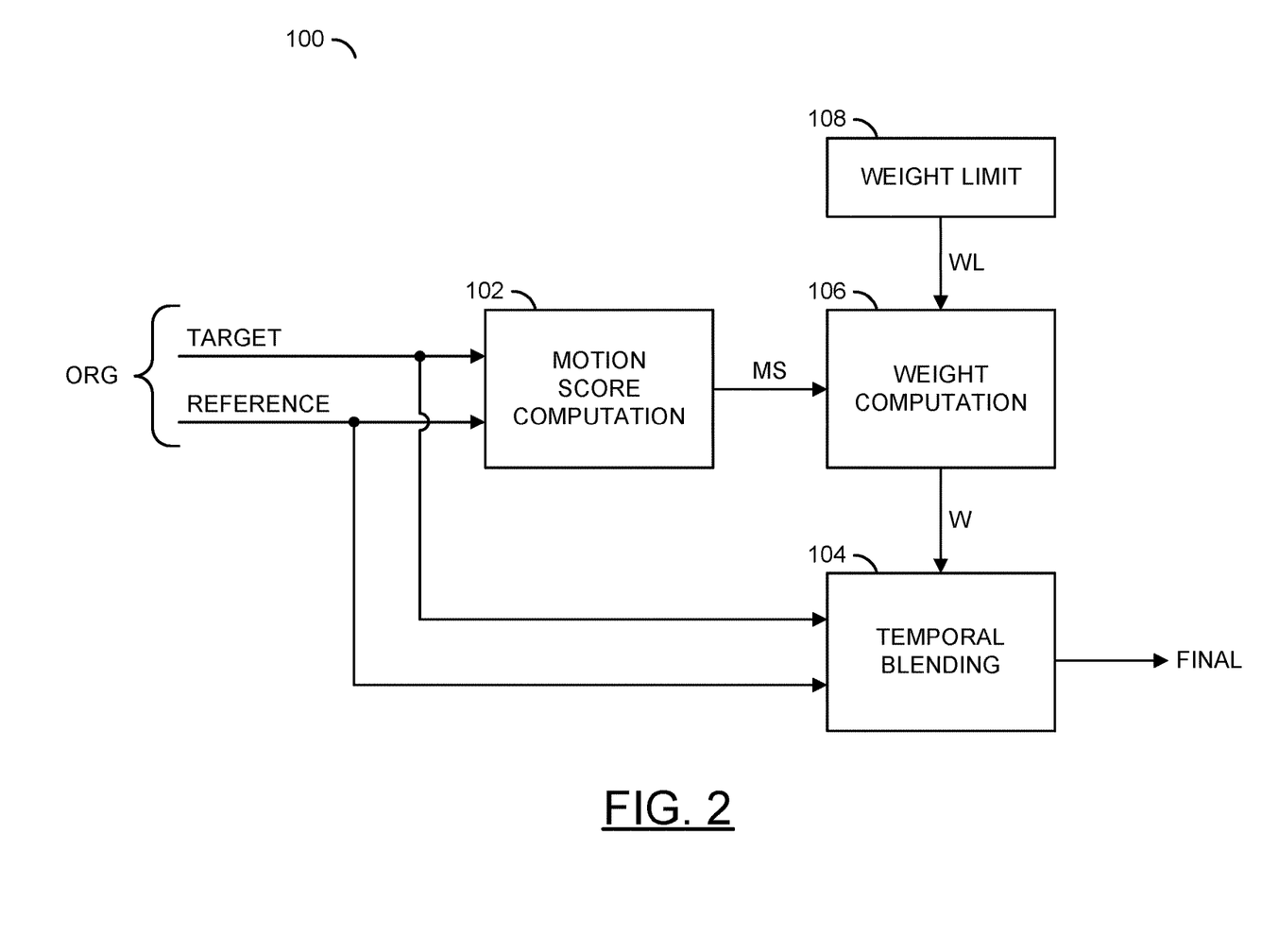
FIG. 2 is a diagram illustrating an example correction circuit in accordance with an embodiment of the invention.

Referring to FIG. 2, a diagram of an example implementation of the correction circuit 100 is shown in accordance with an example embodiment of the invention. In an example, the correction circuit 100 may comprise a block (or circuit) 102, a block (or circuit) 104, a block (or circuit) 106, and a block (or circuit) 108. The circuits 102 to 108 may be implemented utilizing hardware, software, firmware, or any combination thereof in an apparatus.

A signal (e.g., REFERENCE) may be received by the circuit 102 and the circuit 104. The signal REFERENCE generally conveys one or more reference pictures used in motion detection and motion score computation. A signal (e.g., TARGET) may be received by the circuit 102 and the circuit 104. The signal TARGET may carry the target picture for the motion detection and motion score computation. A combination of the signal REFERENCE and the signal TARGET may form the signal ORG (FIG. 1). A signal (e.g., MS) may be generated by the circuit 102 and presented to the circuit 106. The signal MS generally conveys one or more motion scores computed based upon the target and reference pictures. A signal (e.g., W) may be generated by the circuit 106 and presented to the circuit 104. The signal W may convey one or more weight values to the circuit 104. The circuit 104 may generate and present the signal FINAL. The circuit 104 may be configured to generate the signal FINAL by combining target samples from the target picture and reference samples from the one or more reference pictures based upon the weight value received by the circuit 104 via the signal W.

The circuit 102 may implement a motion detection circuit. The motion detection circuit 102 may be operational to perform a motion detection between the target samples in the target picture and the reference samples in the reference pictures. A result of the motion detection (e.g., motion vectors and/or motion scores) may be presented in the signal MS. In an example, the circuit 102 may be configured to compute motion scores in a number of ways. In various embodiments, the circuit 102 may:

compute motion scores using tonal values as described in U.S. Non-provisional application Ser. No. 14/580,867, which is herein incorporated by reference in its entirety;

compute motion scores using pictures adjusted based on global brightness as described in U.S. Non-provisional application Ser. No. 14/732,968, which is herein incorporated by reference in its entirety;

compute motion scores by combining multiple picture differences as described in U.S. Non-provisional application Ser. No. 14/636,618, which is herein incorporated by reference in its entirety;

compute motion scores using big and small areas as described in U.S. Non-provisional application Ser. No. 14/667,950, which is herein incorporated by reference in its entirety; and/or adjust local lighting before computing the motion scores as described in U.S. Non-provisional application Ser. No. 15/897,460, which is herein incorporated by reference in its entirety.

In an example, the circuit 104 may implement a temporal blending circuit. The circuit 104 is generally operational to temporally blend weighted versions of the target samples of the target picture received in the signal TARGET and the reference samples of the reference pictures received in the signal REFERENCE. The weighting of the samples is generally based upon the weight values received in the signal W.

The circuit 106 may implement a weight value computation circuit. The circuit 106 is generally operational to compute one or more weight values based upon the one or more motion scores received from the circuit 102 via the signal MS. The circuit 106 may be further configured to limit a maximum value of the one or more weight values based upon one or more criteria setting a maximum amount of temporal blending. The one or more criteria setting the maximum amount of temporal blending may be provided (or implemented) by the circuit 108. The circuit 108 may be configured to communicate the one or more criteria setting the maximum amount of temporal blending to the circuit 106 via a signal (e.g., WL). In some embodiments, the circuit 106 and the circuit 108 may be implemented as a single (combined or integrated) block (or circuit).

The circuit 108 may implement a limit circuit. The circuit 108 is generally operational to limit the weight values computed by the circuit 106 based upon one or more separate criteria for setting a maximum amount of temporal blending. In one example, the limits provided by the circuit 108 may be predefined (e.g., programmed). In another example, the limits may be dynamically adjusted based upon characteristics of the target and reference pictures. In various embodiments where the limits are dynamically adjusted, the adjustment may be based upon one or more criteria, including, but not limited to, motion, noise, brightness, tone, and/or location(position).

Figure 3:
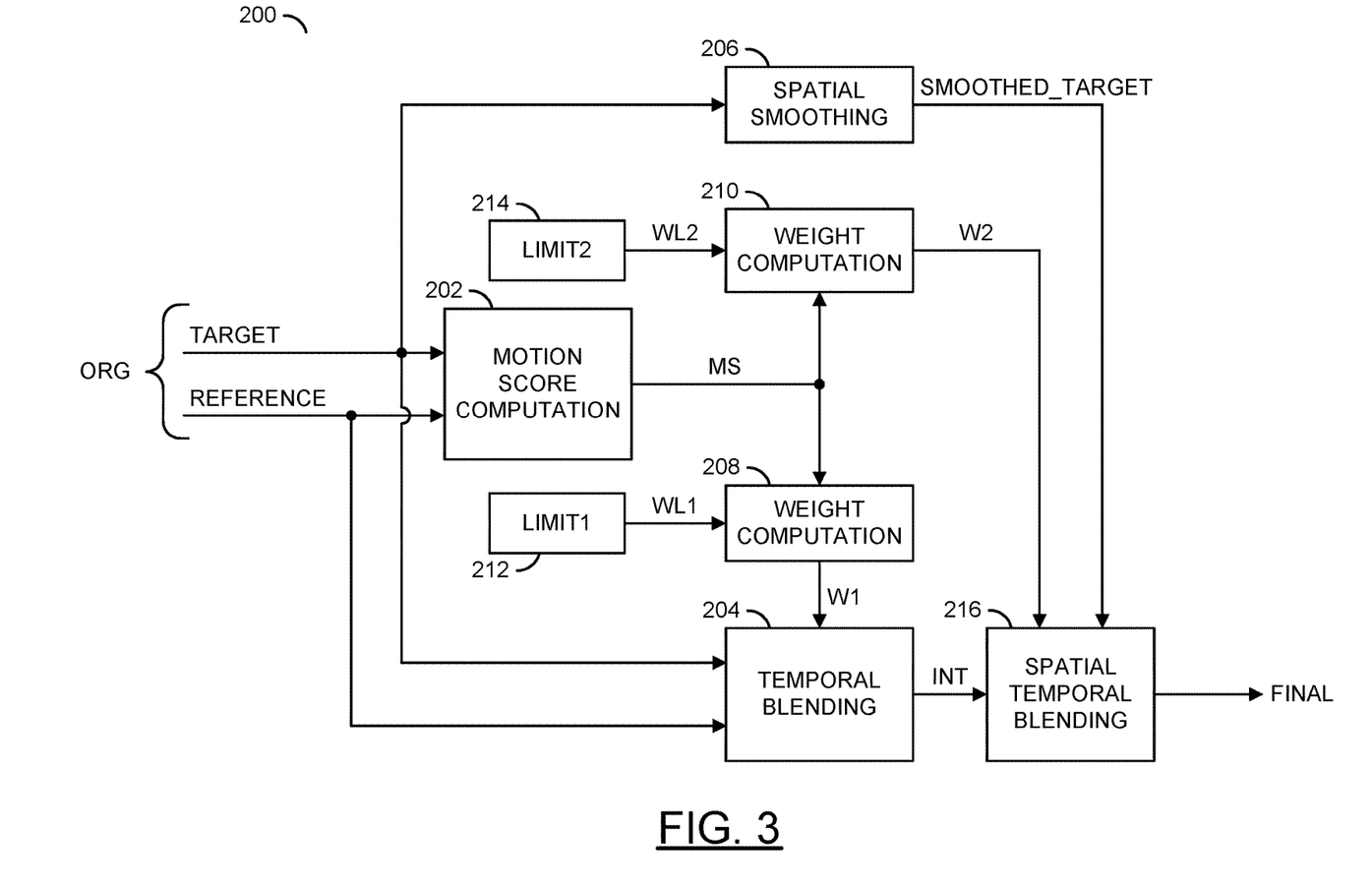
FIG. 3 is a diagram illustrating another example correction circuit in accordance with an embodiment of the invention.

Referring to FIG. 3, a diagram of a circuit 200 is shown illustrating another example of a correction circuit in accordance with an example embodiment of the invention. The circuit 200 may be used to implement the correction circuit 100. The circuit 200 generally comprises a block (or circuit) 202, a block (or circuit) 204, a block (or circuit) 206, a block (or circuit) 208, a block (or circuit) 210, a block (or circuit) 212, a block (or circuit) 214, and a block (or circuit) 216. The circuits 202 to 216 may be implemented utilizing hardware, software, firmware, or any combination thereof in an apparatus.

The signal REFERENCE may be received by the circuit 202 and the circuit 204. The signal REFERENCE generally conveys the reference picture(s) used in motion detection and motion score computation. The signal TARGET may be received by the circuit 202, the circuit 204, and the circuit 206. The signal TARGET may carry the target picture for the motion detection and motion score computation. A combination of the signal REFERENCE and the signal TARGET may form the signal ORG (FIG. 1). The signal MS may be generated by the circuit 202 and presented to the circuit 208 and the circuit 210. The signal MS generally conveys one or more motion scores computed based upon the target and reference pictures.

A signal (e.g., SMOOTHED_TARGET) may be generated by the circuit 206. The circuit 206 is generally operational to spatially smooth the target samples of the target picture received in the signal TARGET. In various embodiments, the spatial smoothing operation of the circuit 206 may be implemented using conventional techniques. In an example, the smoothing may be based on the luminance components of the target samples. The smoothed target samples may be presented to the circuit 216 in the signal SMOOTHED_TARGET. The smoothing performed by the block 206 may be implemented using conventional spatial noise reduction techniques. In an application where filtering still pictures, spatial noise reduction for still pictures may be used.

A signal (e.g., W1) may be generated by the circuit 208 and presented to the circuit 204. The signal W1 may convey one or more first weight values to the circuit 204. The circuit 204 may generate and present an intermediate signal (e.g., INT) to the circuit 216. The circuit 204 may be configured to generate the signal INT by combining target samples from the target picture and reference samples from the one or more reference pictures based upon the first weight value received by the circuit 204 via the signal W1.

A signal (e.g., W2) may be generated by the circuit 210 and presented to the circuit 216. The signal W2 may convey one or more second weight values to the circuit 216. The circuit 216 may generate and present the signal FINAL. The circuit 216 may be configured to generate the signal FINAL by combining samples from the signal INT and samples from the signal SMOOTHED_TARGET based upon the second weight value received by the circuit 216 via the signal W2.

The circuit 202 may implement a motion detection circuit. The motion detection circuit 202 may be operational to perform a motion detection between the target samples in the target pictures and the reference samples in the reference pictures. A result of the motion detection (e.g., motion vectors and/or motion scores) may be presented in the signal MS. The circuit 202 may be configured to compute motion scores similarly to the circuit 102.

In an example, the circuit 204 may implement a temporal blending circuit. The circuit 204 is generally operational to temporally blend weighted versions of the target samples of the target picture received in the signal TARGET and the reference samples of the reference pictures received in the signal REFERENCE. The weighting of the samples is generally based upon the weight values received in the signal W1. The circuit 204 may be configured to perform temporal blending similarly to the circuit 104.

The circuit 206 is generally operational to spatially smooth the target samples of the target picture received in the signal TARGET. The spatial smoothing performed by the circuit 206 is generally configured to reduce spatial noise. In an example, the smoothing may be based on the luminance components of the target samples. The smoothed target samples may be presented in the signal SMOOTHED_TARGET.

The circuit 208 may implement a weight value computation circuit. The circuit 208 is generally operational to compute one or more weight values based upon the one or more motion scores received from the circuit 202 via the signal MS. The circuit 208 may be configured to limit a maximum value of the one or more weight values conveyed in the signal W1 based upon one or more criteria setting a maximum amount of temporal blending. The one or more criteria setting the maximum amount of temporal blending may be provided by the circuit 212. The circuit 212 may be configured to communicate the one or more criteria setting the maximum amount of temporal blending to the circuit 208 via a signal (e.g., WL1). In some embodiments, the circuit 208 and the circuit 212 may be implemented as a single (combined or integrated) block (or circuit).

The circuit 210 may implement a weight value computation circuit. The circuit 210 is generally operational to compute one or more weight values based upon the one or more motion scores received from the circuit 202 via the signal MS. The circuit 210 may be configured to limit a maximum value of the one or more weight values conveyed in the signal W2 based upon one or more criteria setting a maximum amount of spatial temporal blending. The one or more criteria setting the maximum amount of spatial temporal blending may be provided by the circuit 214. The circuit 214 may be configured to communicate the one or more criteria setting the maximum amount of spatial temporal blending to the circuit 210 via a signal (e.g., WL2). In some embodiments, the circuit 210 and the circuit 214 may be implemented as a single (combined or integrated) block (or circuit).

The circuit 212 may implement a limit circuit. The circuit 212 is generally operational to limit the weight values computed by the circuit 208 based upon one or more criteria setting a maximum amount of temporal blending. In one example, the limits provided by the circuit 212 may be predefined (e.g., programmed). In another example, the limits may be dynamically adjusted based upon characteristics of the target and reference pictures. In various embodiments where the limits are dynamically adjusted, the adjustment may be based upon one or more criteria, including, but not limited to, motion, noise, brightness, tone, and/or location.

The circuit 214 may implement a limit circuit. The circuit 214 is generally operational to limit the weight values computed by the circuit 210 based upon one or more criteria setting a maximum amount of spatial temporal blending. In one example, the limits provided by the circuit 214 may be predefined (e.g., programmed). In another example, the limits may be dynamically adjusted based upon characteristics of the target and reference pictures. In various embodiments where the limits are dynamically adjusted, the adjustment may be based upon one or more criteria, including, but not limited to, motion, noise, brightness, tone, and/or location(position).

In an example, the circuit 216 may implement a spatial temporal blending circuit. The circuit 216 is generally operational to blend weighted versions of samples of the intermediate signal received in the signal INT and the smoothed target samples received in the signal SMOOTHED_TARGET. The weighting of the samples is generally based upon the weight values received in the signal W2.

In embodiments implementing the spatial temporal filter circuit 200, where temporal filtering is not used or is weak (e.g., due to detected motion), spatial filtering may be used so that the moving parts of the target picture will not be so noisy. However, the noise reduction comes at a cost of less spatial detail. In an example where the circuit 216 is configured to blend according to the following Equation 3:

$$\text{FINAL}[N,y,x]=(1-W2[N,y,x])*\text{SMOOTHED\_TARGET}[N,y,x]+W2[N,y,x]*\text{INT}[N,y,x], \quad \text{EQ. 3}$$

setting a maximum value on W2 will set a maximum on the fraction of the temporal reference used. For example, the signal INT may include some temporal reference data blended in, but the signal SMOOTHED_TARGET comes only from the signal TARGET and, therefore, has no temporal reference data blended in. Since W2 is used to weight the signal INT, limiting how large W2 may be limits the amount of the temporal reference data that may be blended in the signal FINAL. Equivalently, when circuit 216 is configured to blend according to the following Equation 4:

$$\text{FINAL}[N,y,x]=W2[N,y,x]*\text{SMOOTHED\_TARGET}[N,y,x]+(1-W2[N,y,x])*\text{INT}[N,y,x], \quad \text{EQ. 4}$$

setting a minimum value on W2 will set a maximum on the fraction of the temporal reference used. For example, the signal INT may include some temporal reference data blended in, but the signal SMOOTHED_TARGET comes only from the signal TARGET and, therefore, has no temporal reference data blended in. Since (1−W2) is used to weight the signal INT, limiting how small W2 may be limits how large (1−W2) may be, hence limiting the maximum amount of the temporal reference data that may be blended in the signal FINAL.

Figure 4:
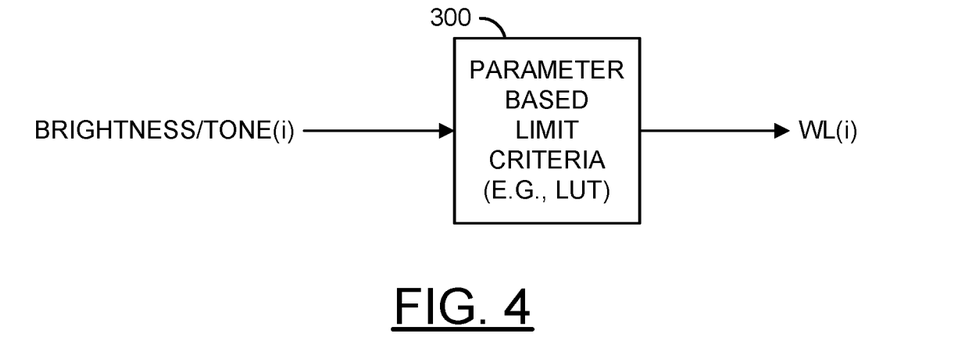
FIG. 4 is a diagram illustrating an implementation of a limiting criteria in accordance with an example embodiment of the invention.

Referring to FIG. 4, a diagram of an example weight limit circuit 300 is shown in accordance with an example embodiment of the invention. In an example, the circuit 300 may implement a parameter based limit criteria. The circuit 300 may be used to implement the circuit 108 of FIG. 2 and the circuits 212 and 214 of FIG. 3. In an example, the circuit 300 may be implemented using a lookup table (LUT) programmed according to desired criteria for setting a limit or limits on the maximum amount of blending performed. In an example, brightness and/or tone values (e.g., BRIGHTNESS/TONE(i)) may be used to determine corresponding limits (e.g., WL(i)) on the weight values. A discussion on determining whether part of a picture is moving based in part on tone may be found in co-pending U.S. Non-provisional application Ser. No. 14/580,867, which is herein incorporated by reference. In embodiments implementing a limit criteria based on brightness and/or tone, the circuit 108 (FIG. 2) and/or the circuits 212 and 214 (FIG. 3) may be implemented using the circuit 300 to set a maximum temporal filter strength based on brightness and/or tone. In applications where certain tonal ranges are noisier than others, the less noisy tones may get a higher minimum weight value (e.g., W, W1, and W2).

Figure 5:
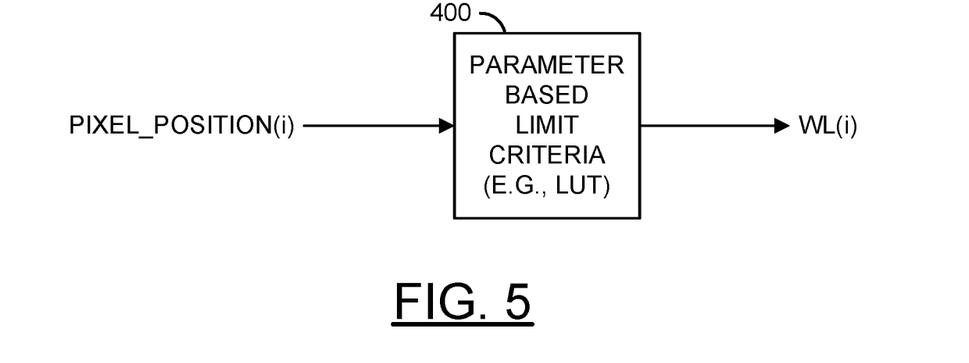
FIG. 5 is a diagram illustrating an implementation of another limiting criteria in accordance with an example embodiment of the invention.

Referring to FIG. 5, a diagram of an example weight limit circuit 400 is shown in accordance with an example embodiment of the invention. The circuit 400 may be used to implement the circuit 108 of FIG. 2 and the circuits 212 and 214 of FIG. 3. In an example, the circuit 400 may implement a parameter based limit criteria. In an example, the circuit 400 may be implemented using a lookup table (LUT) programmed according to the limit criteria of a particular application. In an example, pixel positions (e.g., PIXEL POSITIONS(i)) may be used to determine corresponding limits (e.g., WL(i)) on the weight values. Noise levels may vary with position, so a higher minimum weight value W may be used where the picture is less noisy. In an example, noise levels may vary with position when vignette (also known as lens shading) correction is used. A lens will typically attenuate incident light in the corners relative to the center. To compensate, an image processor may use more digital gain in the corners. The higher digital gain generally makes the corners noisier. In another example, noise levels may vary with position when lens geometric correction or other spatial warping is performed. Areas of the output picture that are upsampled more (or downsampled less) then other parts will generally be noisier. By using weight limiting criteria that take into account position, the less noisy parts of the picture may be given a higher minimum weight value W.

Figure 6:
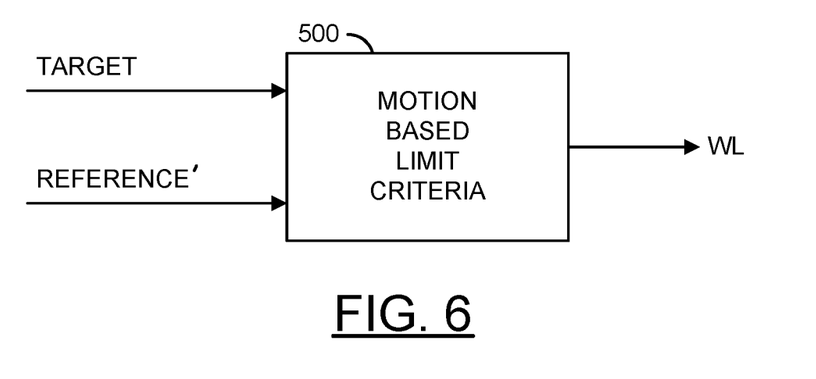
FIG. 6 is a diagram illustrating an implementation of still another limiting criteria in accordance with an example embodiment of the invention.

Referring to FIG. 6, a diagram of a circuit 500 is shown illustrating an example implementation of a limiting criteria in accordance with another example embodiment of the invention. The circuit 500 may be used to implement the circuit 108 of FIG. 2 and the circuits 212 and 214 of FIG. 3. In various embodiments, the circuit 500 may be configured to perform a secondary motion detection operation that is different from the primary motion detection performed by the circuit 102 (FIG. 2) and the circuit 202 (FIG. 3). In an example, the circuit 500 may be configured to receive the signal TARGET and a signal (e.g., REFERENCE'). The circuit 500 may be configured to generate a signal (e.g., WL) in response to the signals TARGET and REFERENCE'. The signal REFERENCE' may comprise one or more reference frames from a point in time that is further back than the reference frames utilized for the primary motion detection performed by the circuits 102 and 202.

The use of a reference frame further back in time may be particularly useful for recursive filters, because if there is no motion between the target and reference (at a particular sample) it still may be better to not use a very strong filter, as doing so may actually increase noise compared to using a weaker filter. In an example, a sequence of frames (e.g., frames 1 to 10) may be available (e.g., stored in a buffer or memory) for filtering, where the target frame is frame 10 and the reference frame is frame 9. In an example, the following assumptions are made: there may be motion (at a sample being filtered) between frames 8 and 9, but not between frames 9 and 10; because there is motion between frames 8 and 9, frame 9 gets no temporal filtering, so that (at the sample being filtered) the output for frame 9 is the same as the input for frame 9; and the weight W will be in the range [5%, 100%]. If there is no motion for an extended period, the strongest filtering comes from using the smallest weight (5%). But in the example above, the sample in frame 9 and in frame 10 both have no noise reduction (e.g., target input is always unfiltered), so the way to get the most noise reduction is actually to use W=50%. Thus, a separate limiting criteria that takes into account a frame further back in time (e.g., frame 8) may determine that the maximum weight W should be limited to 50% instead of using the very strong 100%.

Figure 7:
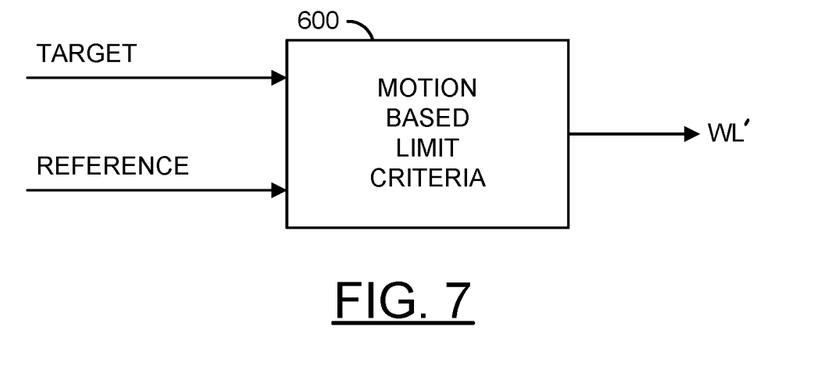
FIG. 7 is a diagram illustrating an implementation of an example implementation of yet another limiting criteria in accordance with an example embodiment of the invention.

Referring to FIG. 7, a diagram of a circuit 600 is shown illustrating an example implementation of a limiting criteria in accordance with yet another example embodiment of the invention. The circuit 600 may be used to implement the circuit 108 of FIG. 2 and the circuits 212 and 214 of FIG. 3. In various embodiments, the circuit 600 may be configured to receive the same inputs as the circuits 102 or 202. However, the circuit 600 may be configured to perform a secondary motion detection operation that is different from the primary motion detection performed by the circuit 102 (FIG. 2) and the circuit 202 (FIG. 3). In an example, the circuit 600 may be configured to receive the signal TARGET and the signal REFERENCE. The circuit 600 may be configured to generate a signal (e.g., WL') in response to the signals TARGET and REFERENCE.

In an example, the primary motion detection performed by the circuits 102 and 202 may be configured to use local lighting correction (e.g., as described in co-pending U.S. Non-provisional application Ser. No. 15/897,460, which is herein incorporated by reference in its entirety) and the secondary motion detection performed by the circuit 600 may be configured not to use local lighting correction. The difference between the primary and secondary motion detection is useful because of the following: on the one hand, using local lighting correction may result in a false negative, where real motion is classified as simply a local lighting change; on the other hand, if local lighting correction is not used, any moderate or strong change in local lighting may result in a false positive.

There are two scenarios to consider: a first scenario, where there is no motion but there is a local lighting change, and a second scenario, where there is motion, but what is moving does not have much fine spatial detail, so if local average signal values are discounted (as happens when local lighting correction is used) motion will not be detected. In each scenario, three types of motion detection may be considered: performing motion detection never using local lighting correction (conventional); performing motion detection always using local lighting correction (e.g., as described in co-pending U.S. Non-provisional application Ser. No. 15/897,460, which is herein incorporated by reference in its entirety); and performing motion detection both with local lighting correction and without local lighting correction.

In the first scenario, where there is no motion, but there is a local lighting change:
  when local lighting correction is never used, there appears to be big motion, so a large weight (e.g., W=1) may be used, and there is a big jump in noise;
  when local lighting correction is always used, no motion is detected, so a small weight (e.g., W=0.05) may be used, and image quality is very good;
  when motion is detected both with local lighting correction and without local lighting correction, if the latter detects motion, the minimum weight may be raised up to 0.3 based on the strength of the detection. The picture may be somewhat noisier than when W=0.05, but the increase in noise is not that bad, as W=0.3 is still reasonably strong noise reduction.

In the second scenario, where there is motion, but what is moving does not have much fine spatial detail, so if local average signal values are discounted (as happens when local lighting correction is used) motion will not be detected:

When local lighting correction is never used, the motion is detected, and the image quality is good.

When local lighting correction is always used, no motion is detected so a small weight (e.g., W=0.05) may be used. Using only such a small weight when there is motion may cause severe artifacts; the "old" signal may almost freeze in place.

When motion is detected both with local lighting correction and without local lighting correction, a weight of W=0.3 may be used, which creates some artifacts, but not nearly so bad as W=0.05. In general, when a limiting criteria in accordance with an embodiment of the invention is implemented, the worst possible quality achieved over the above scenarios is better than the worst possible quality achieved when an embodiment of the invention is not implemented.

Figure 8:
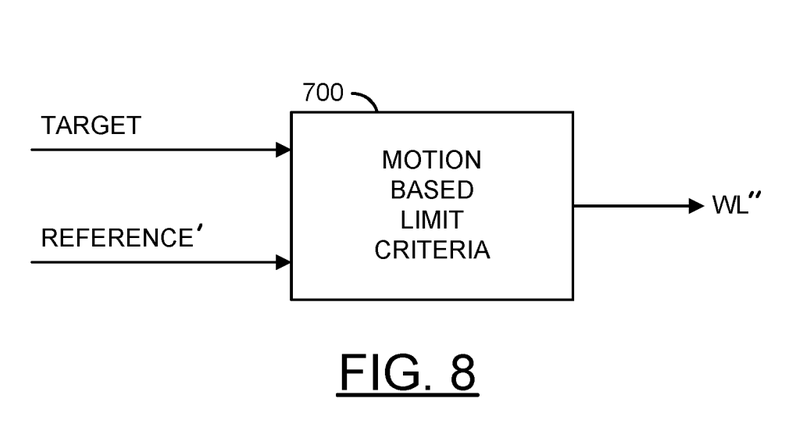
FIG. 8 is a diagram illustrating an implementation of a further limiting criteria in accordance with an example embodiment of the invention.

Referring to FIG. 8, a diagram of a circuit 700 is shown illustrating an example implementation of a limiting criteria in accordance with still another example embodiment of the invention. The circuit 700 may be used to implement the circuit 108 of FIG. 2 and the circuits 212 and 214 of FIG. 3. In various embodiments, the circuit 700 may be configured to perform a secondary motion detection operation that is different from the primary motion detection performed by the circuit 102 (FIG. 2) and the circuit 202 (FIG. 3). In an example, the circuit 700 may be configured to receive the signal TARGET and the signal REFERENCE'. The circuit 700 may be configured to generate a signal (e.g., WL") in response to the signals TARGET and REFERENCE'. The circuit 700 may be configured to perform a secondary motion detection that is different than the primary motion detection, but combine the techniques described above. Specifically the primary motion detection uses local lighting correction (e.g., as described in co-pending U.S. Non-provisional application Ser. No. 15/897,460, which is herein incorporated by reference in its entirety), while the secondary motion detection does not use local lighting correction and uses frames further back in time.

Figure 9:
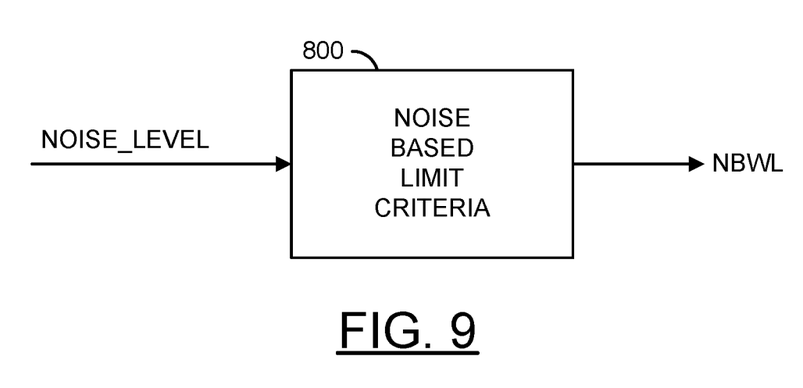
FIG. 9 is a diagram illustrating an implementation of still a further limiting criteria in accordance with an example embodiment of the invention.

Referring to FIG. 9, a diagram of a circuit 800 is shown illustrating an example implementation of a limiting criteria in accordance with another embodiment of the invention. The circuit 800 may be used to implement the circuit 108 of FIG. 2 and the circuits 212 and 214 of FIG. 3. In various embodiments, the circuit 800 may be configured to utilize noise level information to set a limit on the maximum amount of blending to be performed. In an example, the circuit 800 may be configured to receive a signal (e.g., NOISE_LEVEL). The circuit 800 may be configured to generate a signal (e.g., NBWL) in response to the signal NOISE_LEVEL. The signal NOISE_LEVEL may comprise information about a known noise level or an anticipated noise level for particular areas of the target image. In general, very low values of W are only needed when noise is very high. If some areas of the target picture are known to be less noisy, a strong temporal filter is not needed there, and a risk of artifacts associated with strong temporal filtering may be avoided.

In various embodiments, an apparatus an/or method may be implemented that performs temporal filtering based on two or more separate criteria. In various embodiments, a first criteria may be applied to determine how strong, generally, the temporal filtering should be for the overall image. In addition, one or more second criteria may be applied to adjust (reduce, increase, etc.) the overall filter strength to account for local variations in noise (e.g., due to lighting, motion, sensor variation, gain, etc.). Because local noise effects may vary, there is generally not a single typical value for the second criteria. Instead, the amount of adjustment provided by the one or more second criteria may vary (e.g., dynamically) as well to provide an optimum amount of filtering for each set of conditions.

In an example, the determination relative to the first criteria regarding how strong the overall filtering should be generally depends on how much noise is present and how much light is present. The amount of noise that is present generally depends on the physical camera (sensor) utilized. A more expensive or larger sensor is generally less noisy. The physical camera being utilized and the amount of light available are generally known. Thus, a first factor in the determination relative to the first criteria regarding how strong the overall filtering should be relates to how much noise is present, which may depend on the camera and the amount of gain being applied.

A second factor in the determination relative to the first criteria regarding how strong the overall filtering should be generally relates to how the camera is expected to be used. In general, a moving camera (e.g., sports, dash, pocket, drone, etc.) and a stationary camera (mounted, security, etc.) may be expected to have different typical amounts of frame to frame change and, therefore, different filtering needs. For example, if a scene is expected to often be largely stationary a stronger filter may be applied. A security camera, which is generally mounted in a fixed location (e.g., the camera is stationary), will typically have less frame to frame change than a sports camera that is worn on a person. Therefore, a stronger temporal filter may be used for the security camera with less concern for artifacts from filtering too strongly. In general, the two factors described above are generally addressed by application of the first criteria in determining the maximum amount of the reference frame(s) to be blended with the target frame to produce a desired temporal filtering.

In various embodiments, a second criteria is applied in addition to the first criteria to dial back the maximum amount of filtering (blending) applied in producing a final filtered frame. In an example, a noisy and stationary camera may call for strong filtering (e.g., 95% of reference frame) overall based on the first criteria, while application of the second criteria may tone down the filtering (e.g., back to 70% of the reference frame) to better account for local conditions not optimally addressed by the maximum amount. In various embodiments, the application of the first criteria along with the separate second criteria generally provides a result that is better than when only the first criteria is applied.

Figure 10:
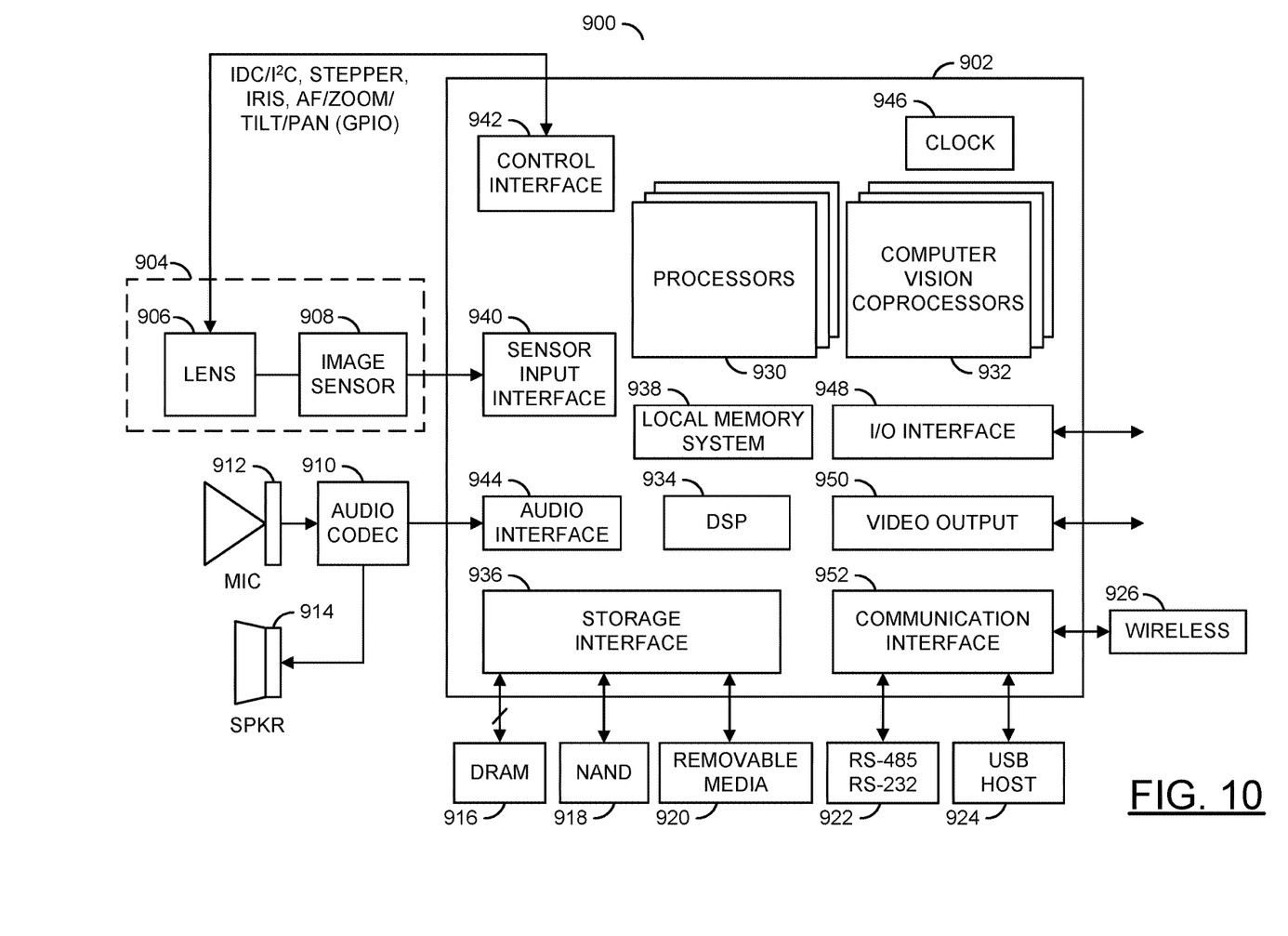
FIG. 10 is a diagram of a camera system illustrating a computer vision system in which a temporal filter with maximum temporal blend amount criteria in accordance with an embodiment of the invention may be implemented.

Referring to FIG. 10, a diagram of a camera system 900 is shown illustrating an example implementation of a computer vision system in accordance with an embodiment of the invention. In one example, the electronics of the camera system 900 may be implemented as one or more integrated circuits. In an example, the camera system 900 may be built around a processor/camera chip (or circuit) 902. In an example, the processor/camera chip 902 may be implemented as an application specific integrated circuit (ASIC) or system on chip (SOC). The processor/camera circuit 902 generally incorporates hardware and/or software/firmware that may be configured to implement the processors, circuits, and processes described above in connection with FIG. 1 through FIG. 9.

In an example, the processor/camera circuit 902 may be connected to a lens and sensor assembly 904. In some embodiments, the lens and sensor assembly 904 may be a component of the processor/camera circuit 902 (e.g., a SoC component). In some embodiments, the lens and sensor assembly 904 may be a separate component from the processor/camera circuit 902 (e.g., the lens and sensor assembly may be an interchangeable component compatible with the processor/camera circuit 902). In some embodiments, the lens and sensor assembly 904 may be part of a separate camera connected to the processor/camera circuit 902 (e.g., via a video cable, a high definition media interface (HDMI) cable, a universal serial bus (USB) cable, an Ethernet cable, or wireless link).

The lens and sensor assembly 904 may comprise a block (or circuit) 906 and/or a block (or circuit) 908. The circuit 906 may be associated with a lens assembly. The circuit 908 may be an image sensor. The lens and sensor assembly 904 may comprise other components (not shown). The number, type and/or function of the components of the lens and sensor assembly 904 may be varied according to the design criteria of a particular implementation.

The lens assembly 906 may capture and/or focus light input received from the environment near the camera 60. The lens assembly 906 may capture and/or focus light for the image sensor 908. The lens assembly 906 may implement an optical lens. The lens assembly 906 may provide a zooming feature and/or a focusing feature. The lens assembly 906 may be implemented with additional circuitry (e.g., motors) to adjust a direction, zoom and/or aperture of the lens assembly 906. The lens assembly 906 may be directed, tilted, panned, zoomed and/or rotated to provide a targeted view of the environment near the camera 60.

The image sensor 908 may receive light from the lens assembly 906. The image sensor 908 may be configured to transform the received focused light into digital data (e.g., bitstreams). In some embodiments, the image sensor 908 may perform an analog to digital conversion. For example, the image sensor 908 may perform a photoelectric conversion of the focused light received from the lens assembly 906. The image sensor 908 may present converted image data as a color filter array (CFA) formatted bitstream. The processor/camera circuit 902 may transform the bitstream into video data, video files and/or video frames (e.g., human-legible content).

The processor/camera circuit 902 may also be connected to (i) an optional audio input/output circuit including an audio codec 910, a microphone 912, and a speaker 914, (ii) a memory 916, which may include dynamic random access memory (DRAM), (iii) a non-volatile memory (e.g., NAND flash memory) 918, a removable media (e.g., SD, SDXC, etc.) 920, one or more serial (e.g., RS-485, RS-232, etc.) devices 922, one or more universal serial bus (USB) devices (e.g., a USB host) 924, and a wireless communication device 926.

In various embodiments, the processor/camera circuit 902 may comprise a number of blocks (or circuits) 930, a number of blocks (or circuits) 932, a block (or circuit) 934, a block (or circuit) 936, a block (or circuit) 938, a block (or circuit) 940, a block (or circuit) 942, a block (or circuit) 944, a block (or circuit) 946, a block (or circuit) 948, a block (or circuit) 950, and/or a block (or circuit) 952. The number of circuits 930 may be processor circuits. In various embodiments, the circuits 930 may include one or more embedded processors (e.g., ARM, etc.). The circuits 932 may implement a number of computer vision related coprocessor circuits. In an example, one or more of the circuits 932 may implement a two-stage object detection engine in accordance with an example embodiment of the invention. The circuit 934 may be a digital signal processing (DSP) module. In some embodiments, the circuit 934 may implement separate image DSP and video DSP modules. The circuit 936 may be a storage interface. The circuit 936 may interface the processor/camera circuit 902 with the DRAM 916, the non-volatile memory 918, and the removable media 920.

The circuit 938 may implement a local memory system. In some embodiments, the local memory system 938 may include, but is not limited to a cache (e.g., L2CACHE), a direct memory access (DMA) engine, graphic direct memory access (GDMA) engine, and fast random access memory. The circuit 940 may implement a sensor input (or interface). The circuit 942 may implement one or more control interfaces including but not limited to an inter device communication (IDC) interface, an inter integrated circuit ($I^2C$) interface, a serial peripheral interface (SPI), and a pulse width modulation (PWM) interface. The circuit 944 may implement an audio interface (e.g., an $I^2S$ interface, etc.). The circuit 946 may implement a clock circuit including but not limited to a real time clock (RTC), a watchdog timer (WDT), and/or one or more programmable timers. The circuit 948 may implement an input/output (I/O) interface. The circuit 950 may be a video output module. The circuit 952 may be a communication module. The circuits 930 through 952 may be connected to each other using one or more buses, interfaces, traces, protocols, etc.

The circuit 918 may be implemented as a nonvolatile memory (e.g., NAND flash memory, NOR flash memory, etc.). The circuit 920 may comprise one or more removable media cards (e.g., secure digital media (SD), secure digital extended capacity media (SDXC), etc.). The circuit 922 may comprise one or more serial interfaces (e.g., RS-485, RS-232, etc.). The circuit 924 may be an interface for connecting to or acting as a universal serial bus (USB) host. The circuit 926 may be a wireless interface for communicating with a user device (e.g., a smart phone, a computer, a tablet computing device, cloud resources, etc.). In various embodiments, the circuits 904-926 may be implemented as components external to the processor/camera circuit 902. In some embodiments, the circuits 904-926 may be components on-board the processor/camera circuit 902.

The control interface 942 may be configured to generate signals (e.g., IDC/I2C, STEPPER, IRIS, AF/ZOOM/TILT/PAN, etc.) for controlling the lens and sensor assembly 904. The signal IRIS may be configured to adjust an iris for the lens assembly 906. The interface 942 may enable the processor/camera circuit 902 to control the lens and sensor assembly 904.

The storage interface 936 may be configured to manage one or more types of storage and/or data access. In one example, the storage interface 936 may implement a direct memory access (DMA) engine and/or a graphics direct memory access (GDMA). In another example, the storage interface 936 may implement a secure digital (SD) card interface (e.g., to connect to the removable media 920). In various embodiments, programming code (e.g., executable instructions for controlling various processors and encoders of the processor/camera circuit 902) may be stored in one or more of the memories (e.g., the DRAM 916, the NAND 918, etc.). When executed by one or more of the processors 930, the programming code generally causes one or more components in the processor/camera circuit 902 to configure video synchronization operations and start video frame processing operations. The resulting compressed video signal may be presented to the storage interface 936, the video output 950 and/or communication interface 952. The storage interface 936 may transfer program code and/or data between external media (e.g., the DRAM 916, the NAND 918, the removable media 920, etc.) and the local (internal) memory system 938.

The sensor input 940 may be configured to send/receive data to/from the image sensor 908. In one example, the sensor input 940 may comprise an image sensor input interface. The sensor input 940 may be configured to transmit captured images (e.g., picture element, pixel, data) from the image sensor 908 to the DSP module 934, one or more of the processors 930 and/or one or more of the coprocessors 932. The data received by the sensor input 940 may be used by the DSP 934 to determine a luminance (Y) and chrominance (U and V) values from the image sensor 908. The sensor input 940 may provide an interface to the lens and sensor assembly 904. The sensor input interface 940 may enable the processor/camera circuit 902 to capture image data from the lens and sensor assembly 904.

The audio interface 944 may be configured to send/receive audio data. In one example, the audio interface 944 may implement an audio inter-IC sound ($I^2S$) interface. The audio interface 944 may be configured to send/receive data in a format implemented by the audio codec 910.

The DSP module 934 may be configured to process digital signals. The DSP module 934 may comprise an image digital signal processor (IDSP), a video digital signal processor DSP (VDSP) and/or an audio digital signal processor (ADSP). The DSP module 934 may be configured to receive information (e.g., pixel data values captured by the image sensor 908) from the sensor input 940. The DSP module 934 may be configured to determine the pixel values (e.g., RGB, YUV, luminance, chrominance, etc.) from the information received from the sensor input 940. The DSP module 934 may be further configured to support or provide a sensor RGB to YUV raw image pipeline to improve image quality, bad pixel detection and correction, demosaicing, white balance, color and tone correction, gamma correction, adjustment of hue, saturation, brightness and contrast adjustment, chrominance and luminance noise filtering.

The I/O interface 948 may be configured to send/receive data. The data sent/received by the I/O interface 948 may be miscellaneous information and/or control data. In one example, the I/O interface 948 may implement one or more of a general purpose input/output (GPIO) interface, an analog-to-digital converter (ADC) module, a digital-to-analog converter (DAC) module, an infrared (IR) remote interface, a pulse width modulation (PWM) module, a universal asynchronous receiver transmitter (UART), an infrared (IR) remote interface, and/or one or more synchronous data communications interfaces (IDC SPI/SSI).

The video output module 950 may be configured to send video data. For example, the processor/camera circuit 902 may be connected to an external device (e.g., a TV, a monitor, a laptop computer, a tablet computing device, etc.). The video output module 950 may implement a high-definition multimedia interface (HDMI), a PAL/NTSC interface, an LCD/TV/Parallel interface and/or a DisplayPort interface.

The communication module 952 may be configured to send/receive data. The data sent/received by the communication module 952 may be formatted according to a particular protocol (e.g., Bluetooth®, ZigBee®, USB, Wi-Fi, UART, etc.). In one example, the communication module 952 may implement a secure digital input output (SDIO) interface. The communication module 952 may include support for wireless communication by one or more wireless protocols such as Bluetooth®, ZigBee®), Institute of Electrical and Electronics Engineering (IEEE) 802.11, IEEE 802.15, IEEE 802.15.1, IEEE 802.15.2, IEEE 802.15.3, IEEE 802.15.4, IEEE 802.15.5, and/or IEEE 802.20, GSM, CDMA, GPRS, UMTS, CDMA2000, 3GPP LTE, 4G/HSPA/WiMAX, SMS, etc. The communication module 952 may also include support for communicating using one or more of the universal serial bus protocols (e.g., USB 1.0, 2.0, 3.0, etc.). The processor/camera circuit 902 may also be configured to be powered via a USB connection. However, other communication and/or power interfaces may be implemented accordingly to meet the design criteria of a particular application.

The processor/camera circuit 902 may be configured (e.g., programmed) to control the one or more lens assemblies 906 and the one or more image sensors 908. The processor/camera circuit 902 may receive raw image data from the image sensor(s) 908. The processor/camera circuit 902 may encode the raw image data into a plurality of encoded video streams simultaneously (in parallel). The plurality of video streams may have a variety of resolutions (e.g., VGA, WVGA, QVGA, SD, HD, Ultra HD, 4K, etc.). The processor/camera circuit 902 may receive encoded and/or uncoded (e.g., raw) audio data at the audio interface 944. The processor/camera circuit 902 may also receive encoded audio data from the communication interface 952 (e.g., USB and/or SDIO). The processor/camera circuit 902 may provide encoded video data to the wireless interface 926 (e.g., using a USB host interface). The wireless interface 926 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The processor/camera circuit 902 may also include support for communication using one or more of the universal serial bus protocols (e.g., USB 1.0, 2.0, 3.0, etc.).

Conventional MCTF reduces noise by taking a weighted average of the current frame and one or more previous frames. The filter is referred to as recursive when the one or more previous frames are themselves MCTF outputs. When there is no motion (or the motion is correctly modeled and compensated), MCTF reduces noise because the output is a weighted average of noisy samples of the same image sample, which will statistically be less noisy than a single sample. Typically, the filter will use the reference picture data more strongly the more the filter determines that, locally, there is no motion. For this kind of filter, motion may mean:

1. in an absolute sense, if there is motion; or
    2. in a relative sense, if there is motion relative to some motion model used to transform the reference frame.

In an example of the latter, some process is used to estimate a motion model between the target and reference frames, and a transformed (motion compensated) reference frame is combined with the target frame. For this case, "motion" means motion between the motion compensated reference frame and the target frame. In various embodiments, the techniques in accordance with the invention do not distinguish between these types of motion. Instead, the techniques look at combining two frames without some kind of transformation of the reference frame (e.g., #1 above) or with some kind of transformation of the reference frame (e.g., #2 above).

In various embodiments, a second criterion is used to limit the amount of a reference picture that is blended in the output of a motion compensated temporal filter. In various embodiments, a primary detection is used to decide how much of the reference frame data to be blended in the output and some secondary criteria are used to limit the amount of reference frame data blended in the output (e.g., limiting the maximum strength of the temporal filter). In various embodiments, the second criteria may include, but are not limited to, motion-based limiting criteria (e.g., a secondary motion detection that is different from the primary motion detection), noise-based limiting criteria, parameter-based limiting criteria (e.g., using brightness, tone, and/or location/position values). However, addition types of limiting criteria may be implemented to meet the design criteria of a particular implementation.

The functions and structures illustrated in the diagrams of FIGS. 1 to 10 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
a processor circuit configured to receive a sequence of pictures; and
a correction circuit configured to (i) generate a motion score based upon target samples from a target picture and reference samples from one or more reference pictures of said sequence of pictures, (ii) generate a first weight value based upon said motion score and a first weight limit value, and (iii) generate a plurality of blended picture samples by combining said target samples and said reference samples based upon said first weight value, wherein said motion score is generated using a primary motion detection process and said first weight limit value is generated using a secondary motion detection process different from said primary motion detection process.

2. The apparatus according to claim 1, wherein said first weight limit sets either a maximum value or a minimum value of said first weight value.

3. The apparatus according to claim 1, wherein said plurality of blended picture samples are generated through temporal blending.

4. The apparatus according to claim 1, wherein said correction circuit is further configured to:
generate a plurality of smoothed target samples by spatially smoothing a plurality of target samples selected from said target picture of said sequence of pictures;
generate a second weight value based upon said motion score and a second weight limit value; and
generate a plurality of final blended picture samples by combining said plurality of blended picture samples and said plurality of smoothed target samples based upon said second weight value.

5. The apparatus according to claim 4, wherein said second weight limit sets either a maximum value or a minimum value of said second weight value.

6. The apparatus according to claim 4, wherein said plurality of final blended picture samples are generated through spatial temporal blending.

7. The apparatus according to claim 1, wherein said secondary motion detection process uses reference frames from a point further back in time than the reference frames used by the primary motion detection process.

8. The apparatus according to claim 1, wherein said primary motion detection process is configured to perform local lighting correction and said secondary motion detection process is configured not to perform local lighting correction.

9. The apparatus according to claim 1, wherein said primary motion detection process is configured to perform local lighting correction and said secondary motion detection process is configured (i) not to perform local lighting correction and (ii) to use reference frames from a point further back in time than the reference frames used by the primary motion detection process.

10. The apparatus according to claim 1, wherein computing said motion score comprises one or more of (i) using tonal values, (ii) adjusting said target and said one or more reference pictures based on global brightness, (iii) combining multiple picture differences, (iv) using big and small areas, and (v) adjusting local lighting before computing said motion score.

11. The apparatus according to claim 1, wherein said apparatus forms part of a digital camera.

12. An apparatus comprising:
a processor circuit configured to receive a sequence of pictures; and
a correction circuit configured to (i) generate a motion score based upon target samples from a target picture and reference samples from one or more reference pictures of said sequence of pictures, (ii) generate a first weight value based upon said motion score and a first weight limit value, and (iii) generate a plurality of blended picture samples by combining said target samples and said reference samples based upon said first weight value, wherein said first weight limit value is generated utilizing at least one of (i) noise level information for particular areas of said target picture, (ii) one or more of brightness or tone values, and (iii) position information corresponding to samples to be blended.

13. A method of temporal filtering comprising:

receiving a sequence of pictures;

generating a motion score based upon target samples from a target picture and reference samples from one or more reference pictures of said sequence of pictures;

generating a first weight value based upon said motion score and a first weight limit value; and generating a plurality of blended picture samples by combining said target samples and said reference samples based upon said first weight value, wherein said motion score is generated using a primary motion detection process and said first weight limit value is generated using a secondary motion detection process different from said primary motion detection process.

14. The method according to claim 13, wherein said first weight limit sets either a maximum value of said first weight value or a minimum value of said first weight value.

15. The method according to claim 13, wherein said plurality of blended picture samples are generated through temporal blending.

16. The method according to claim 13, further comprising:

generating a plurality of smoothed target samples by spatially smoothing a plurality of target samples selected from said target picture of said sequence of pictures;

generating a second weight value based upon said motion score and a second weight limit value; and generating a plurality of final blended picture samples by combining said plurality of blended picture samples and said plurality of smoothed target samples based upon said second weight value.

17. The method according to claim 16, wherein:

said second weight limit sets either a maximum value of said second weight value or a minimum value of said second weight value; and said plurality of final blended picture samples are generated through spatial temporal blending.

18. The method according to claim 13, wherein said secondary motion detection process uses reference frames from a point further back in time than the reference frames used by the primary motion detection process.

19. The method according to claim 13, wherein said primary motion detection process is configured to perform local lighting correction and said secondary motion detection process is configured not to perform local lighting correction.

20. The method according to claim 13, wherein said primary motion detection process is configured to perform local lighting correction and said secondary motion detection process is configured (i) not to perform local lighting correction and (ii) to use reference frames from a point further back in time than the reference frames used by the primary motion detection process.

* * * * *